Patented Oct. 12, 1937

2,095,619

UNITED STATES PATENT OFFICE 2,095,619

ARYL OXIDES

Wesley C. Stoesser, Midland, Mich., and Robert F. Marschner, State College, Pa., assignors to The Dow Chemical Company, Midland, Mich., a corporation of Michigan No Drawing. Application November 2, 1933, Serial No. 696,380

15 Claims. (Cl. 260—150)

This invention concerns new aryl oxides having the general formula

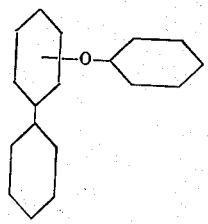

wherein the phenyl and diphenyl radicals may bear other substituents selected from the class consisting of alkyl, nitro, and halogen substituents, and a method of preparing said aryl oxides.

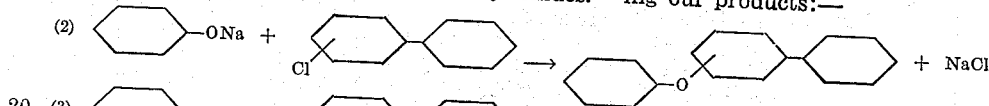

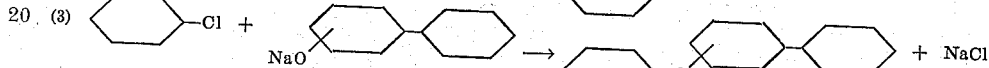

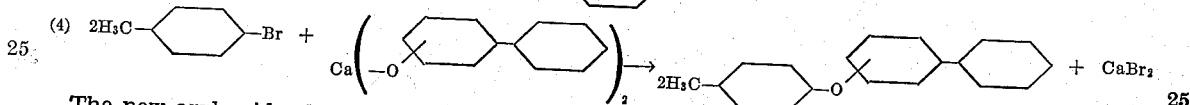

The new aryl oxides herein described are valuable compounds, well adapted to use as intermediate compounds for the preparation of resins, dyes, and related products. Furthermore, a number of said aryl oxides possess physical and chemical properties, e. g. low melting points, stability at high temperatures, chemical inertness toward metals, etc., which make them suited to use as heat transfer agents.

The invention, then, consists in the new compounds and method of preparing the same hereinafter fully described and particularly pointed out in the claims, the following description and examples setting forth in detail only several of the various ways in which the principle of the invention may be employed.

Our new aryl oxides are prepared either by heating a metal phenate with a nuclear halogenated diphenyl compound or by heating a nuclear halogenated benzene compound with a metal salt of a hydroxy-diphenyl compound. In both cases, the reaction involved is similar, i. e. the initial compounds react to split out a metal halide, thereby forming the aryl oxide product.

The general reaction is illustrated by the equation:—

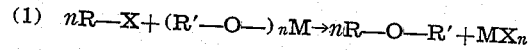

wherein R and R' represent different aromatic radicals of the class consisting of phenyl and diphenyl radicals, which aromatic radicals may bear other substituents of the class consisting of alkyl, nitro, and halogen substituents, X represents a halogen, M represents a metal, and $n$ is the valence of said metal.

The following equations illustrate more specifically the type of reaction involved in preparing our products:—

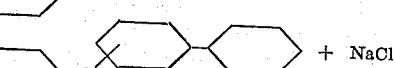

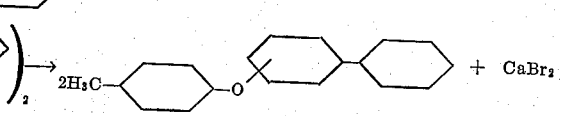

Equation (2) illustrates the reaction of sodium phenate with a chloro-diphenyl to form a phenyl-diphenyl oxide. Equation (3) shows that the same product may similarly be prepared by reacting chloro-benzene with a sodium phenylphenate. Equation (4) illustrates the reaction of an alkyl-substituted bromo-benzene with a divalent metal salt of a phenylphenol to form an alkyl-substituted phenyl-diphenyl oxide.

The phenate or phenylphenate employed as a reactant may be a salt of any metal, e. g. calcium, barium, magnesium, copper, etc. We prefer, however, to employ an alkali metal salt of the phenol or phenylphenol, since such salt can be prepared very readily and usually reacts most smoothly according to our method. Furthermore, the phenate or phenylphenate reactant may bear other nuclear substituents, provided that such other substituents are not more reactive than are the metal or halogen groups which it is desired to react. Thus, as phenate or phenylphenate reactants, we may employ any metal salt of 4-hydroxy-4'-methyl-diphenyl, 2-hydroxy-4'-ethyl-diphenyl, 2-hydroxy-4-chloro-diphenyl, paracresol, 2-nitro-4-methyl-phenol, 4-chloro-phenol, etc.

As a halogenated aromatic reactant, any nuclear halogenated benzene or diphenyl compound, which does not contain substituents more reactive than the halogen, may be used, e. g. chloro-benzene, bromo-benzene, iodo-benzene, the corresponding halogenated diphenyls, chloro-toluene, 2-ethyl-bromo-benzene, 2-nitro-bromo-benzene, 1.4-dichloro-benzene, 4-chloro-bromo-benzene, 4-chloro-4'-bromo-diphenyl, etc. When a polyhalogenated benzene or diphenyl compound is to be employed as a reactant, the halogen which is to enter into the reaction should preferably be more reactive than are the other halogens present, since otherwise a mixture of products is sometimes formed. Thus, other things being equal, we prefer 4-chloro-bromobenzene rather than the analogous compound, 1.4-dichloro-benzene, as a reactant.

In preparing an aryl oxide by our method, a mixture of the necessary reactants, e. g. chlorobenzene and sodium 4-phenyl-phenate, is heated to a reaction temperature, preferably, but not necessarily, in the presence of a catalyst. The reactants may be employed in any desired ratio, but ordinarily we prefer to use approximately equimolecular quantities of the said reactants. As a reaction promoter, we prefer to use a copper-containing catalyst, e. g. copper, cuprous oxide, cuprous chloride, cupric chloride, etc.

The temperature to which the reaction mixture must be heated in order to cause reaction, is dependent upon the particular reactants employed, the presence or absence of a catalyst, and the activity of the catalyst, if used. Ordinarily, when a bromo-benzene or bromo-diphenyl compound is to be reacted in the presence of a copper-containing catalyst, the reaction mixture can be heated at atmospheric pressure to a temperature sufficient to cause reaction. If no catalyst is used, it may be necessary to heat such reaction mixture under superatmospheric pressure in order to attain a reaction temperature. When a chloro-benzene or chloro-diphenyl compound is used as the halo-aromatic reactant, it is frequently necessary to heat the reaction mixture under superatmospheric pressure in order to attain a reaction temperature, even though a catalyst be present.

The temperature necessary to cause reaction in a given instance may readily be determined by withdrawing samples of the reaction mixture from time to time as the temperature is being raised and analyzing the samples to determine whether inorganic halide is being formed. The mixture is heated, preferably with stirring, to a temperature at which a fairly rapid formation of inorganic halide is observed. Heating and stirring are continued until analysis of an aliquot portion of the reaction mixture for inorganic halide shows the reaction to be substantially complete. Usually a reaction mixture is heated at the reaction temperature for from 0.5 to 5 hours, but longer heating is sometimes required.

The aryl oxide product may be separated and purified by usual procedure; for instance, by cooling the reacted mixture, extracting inorganic halide from the latter with water or other solvent, e. g. aqueous ammonia, etc., and either fractionally distilling the residual organic material or fractionally crystallizing the latter from a solvent, e. g. alcohol, acetone, benzene, alcoholic potassium hydroxide, etc.

The following examples illustrate several ways in which the principle of our invention has been practiced, but are not to be construed as limiting the invention.

*Example 1*

A mixture of 170 grams (1 mole) of 2-phenyl-phenol, 56 grams (1 mole) of potassium hydroxide, 123.2 grams (1.1 mole) of chloro-benzene, and 1 gram of finely divided copper was heated to 390° C. in a rotating bomb for 1 hour. The bomb was then cooled and the charge removed therefrom. The reacted mixture was extracted with water to remove potassium chloride therefrom. The residual organic material was fractionally distilled to obtain 116.8 grams of fairly pure 2-phenyl-diphenyl oxide distilling at between 335° and 360° C. at atmospheric pressure. The product was further purified by recrystallization from ethyl alcohol. It was obtained as fine white needle-like crystals melting at 49°–50° C. The product has probably the formula:—

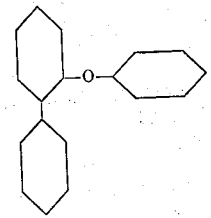

*Example 2*

A mixture of 34 grams (0.2 mole) of 3-hydroxy-diphenyl, 11.2 grams (0.2 mole) of potassium hydroxide, 63.2 grams (0.4 mole) of bromo-benzene, and 1 gram of copper powder was heated in a rotating bomb to 160° C. for 52 hours. The bomb was then cooled and the charge removed therefrom. The product, 3-phenyl-diphenyl oxide, was separated by fractional distillation as a fraction distilling at 369°–371° C. at atmospheric pressure. On cooling said fraction, the product crystallized as fine white needles melting at 17°–18° C. The product has probably the formula:—

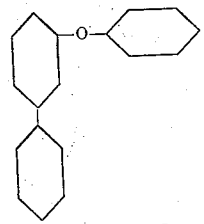

*Example 3*

A mixture of 170 grams (1 mole) of 4-hydroxy-diphenyl, 56 grams (1 mole) of potassium hydroxide, 123.2 grams (1.1 mole) of chloro-benzene, and 1 gram of copper powder was heated in a rotating bomb to between 375° and 400° C. for 3 hours. The bomb was then cooled and the charge removed therefrom. The product, 4-phenyl-diphenyl oxide, was separated from the reaction mixture and purified by procedure similar to that described in Example 1. The product, which was obtained as white plate-like crystals melting at 69°–70° C., has probably the formula:—

*Example 4*

A mixture of 23.5 grams (0.356 mole) of 85 per cent pure potassium hydroxide, 85 grams (0.5 mole) of 2-phenyl-phenol, 79 grams (0.5 mole) of 4-nitro-chloro-benzene, 1 gram of copper powder, and 5 grams of water was heated with stirring for 1.25 hours, the temperature of the mixture being raised gradually during said period from 130° to 300° C. The mixture was then cooled, diluted with sufficient chloro-benzene to form a fairly thin solution thereof, and washed successively with a 5 per cent aqueous sodium hydroxide solution and water. The residual organic material was distilled under vacuum. There was collected 96.4 grams of a fraction distilling for the most part at 268°–270° C. at 25 millimeters pressure. This fraction was recrystallized from alcohol to obtain 94.2 grams (0.323 mole) of product as fine, slightly pinkish colored needles melting at 89°–90° C. The yield of product was 90.8 per cent of theoretical, based on the quantity of potassium hydroxide used. Said product has probably the formula

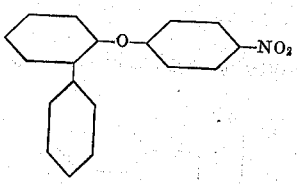

*Example 5*

A mixture of 20 grams (0.304 mole) of 85 per cent pure potassium hydroxide, 85 grams (0.5 mole) of 2-phenyl-phenol, 79 grams (0.5 mole) of 2-nitro-chloro-benzene, and 20 grams of water was heated with stirring for 1 hour, the temperature being raised gradually during this period from 120° to 300° C. The mixture was cooled, diluted with chloro-benzene, and washed successively with a 5 per cent aqueous sodium hydroxide solution and water. The residual organic material was fractionally distilled to collect 85.9 grams (0.295 mole) of product as a fraction which distilled for the most part at 265° C. at 27 millimeters pressure, the yield being 97.2 per cent of theoretical based on the quantity of potassium hydroxide used. The product was a reddish-orange colored viscous liquid which could not be crystallized from alcohol. Said product has probably the formula

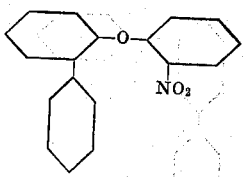

*Example 6*

A mixture of 20 grams (0.5 mole) of sodium hydroxide, 85 grams (0.5 mole) of 4-phenyl-phenol, 79 grams (0.5 mole) of 2-nitro-chloro-benzene, 0.5 gram of copper powder, and 60 grams of water was heated with stirring for 1.5 hours, the temperature being raised gradually from 105° to 300° C. during said period. The product was separated by procedure similar to that described in Example 4. There was obtained 109.4 grams (0.376 mole), or 75.3 per cent the theoretical yield, of product as light yellow colored leaflets melting at 91°–92° C. The product has probably the formula

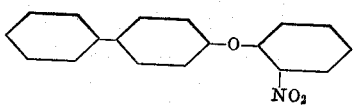

*Example 7*

A mixture of 33 grams (0.5 mole) of 85 per cent pure potassium hydroxide, 54 grams (0.5 mole) of ortho-cresol, 116.5 grams (0.5 mole) of 4-bromo-diphenyl, 0.5 gram of copper powder, and 5 grams of water was heated with stirring to temperatures ranging from 155° to 325° C. for 4 hours. The product was then separated by procedure similar to that described in Example 4. There was obtained 83.6 grams (0.321 mole), or 64.3 per cent the theoretical yield, of product as white leaflets melting at 60°–61° C. The product has probably the formula

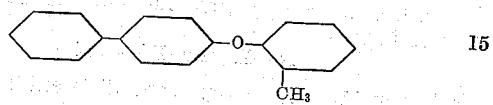

The reactions hereinbefore described may be carried out in the presence of a solvent, e. g. di-phenyl, diphenyl oxide, xylene, etc., but ordinarily no solvent is required. In those cases where we do find it advantageous to employ a reaction solvent, we prefer to use an excess of the halogenated aromatic reactant for such purpose, since thereby the formation of a relatively complex and difficultly separable reaction mixture is avoided.

By procedure similar to that hereinbefore described, a large number of other aryl oxides of our new class can be prepared, such as 4-chloro-phenyl-diphenyl oxide, 2-nitro-4-methyl-phenyl-diphenyl oxide, etc.

Other modes of applying the principle of our invention may be employed instead of those explained, change being made as regards the method or compounds herein disclosed, provided the steps or compounds stated by any of the following claims or the equivalent of such stated steps or compounds be employed.

We therefore particularly point out and distinctly claim as our invention:—

1. The method of making an aryl-oxide which comprises heating to a reaction temperature a mixture of compounds having the respective formulas:

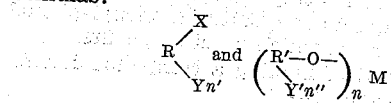

wherein R and R' represent different aromatic radicals, one being the phenyl radical and the other being the diphenyl radical, X represents a halogen, M represents a metal, $n$ is the valence of said metal, Y and Y' represent members of the class consisting of hydrogen and alkyl, nitro, and halogen groups, and $n'$ and $n''$ are integers, each having a value not greater than 2.

2. The method of making an aryl-oxide which comprises heating to a reaction temperature, in the presence of a catalyst capable of promoting reaction, a mixture of compounds having the respective formulas:

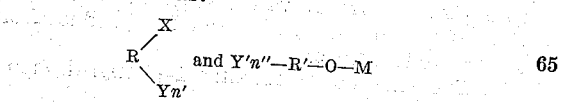

wherein R and R' represent different aromatic radicals, one being the phenyl radical and the other being the diphenyl radical, X represents a halogen, M represents an alkali metal, Y and Y' represent members of the class consisting of hydrogen and alkyl, nitro and halogen groups, and $n'$ and $n''$ are integers, each having a value not greater than 2.

3. The method of making an aryl oxide which comprises heating to a reaction temperature a mixture of compounds having the respective formulas:—

R—X and (R'—O—)$_n$M wherein R and R' represent different aromatic radicals, one being the phenyl radical and the other the diphenyl radical, X represents a halogen, M represents a metal, and $n$ is the valence of the metal.

4. The method of making an aryl oxide which comprises heating to a reaction temperature a mixture of compounds having the respective formulas:—

R—X and R'—OM wherein R and R' represent different aromatic radicals, one being the phenyl radical, and the other the diphenyl radical, X represents a halogen, and M represents an alkali metal.

5. The method of making an aryl oxide which comprises heating to a reaction temperature, in the presence of a copper-containing catalyst, a mixture of compounds having the respective formulas:—

R—X and R'—OM wherein R and R' represent different aromatic radicals, one being the phenyl radical and the other the diphenyl radical, X represents a halogen, and M represents an alkali metal, and thereafter separating the aryl oxide product from the reacted mixture.

6. The method of making a compound having the general formula:—

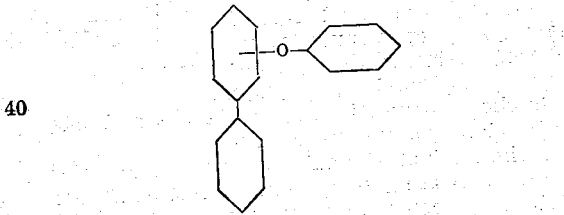

which comprises heating a mixture of a monohalo-benzene and a metal salt of a phenyl-phenol to a temperature at which reaction occurs.

7. The method of making a compound having the general formula:—

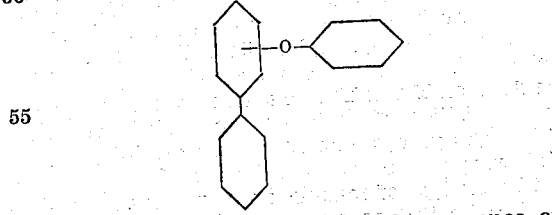

which comprises heating, in the presence of a copper-containing catalyst, a mixture of a monohalo-benzene and a metal salt of a phenyl-phenol to a temperature at which reaction occurs, and thereafter separating the aryl oxide product from the reacted mixture.

8. The method of making 2-phenyl-diphenyl oxide which comprises heating to a reaction temperature a mixture of a monohalo-benzene and an alkali metal 2-phenylphenate.

9. The method of making 3-phenyl-diphenyl oxide which comprises heating to a reaction temperature a mixture of a monohalo-benzene and an alkali metal 3-phenylphenate.

10. The method of making 4-phenyl-diphenyl oxide which comprises heating to a reaction temperature a mixture of a monohalo-benzene and an alkali metal 4-phenylphenate.

11. An aryl-oxide having the general formula:

Y$_{n'}$—R—O—R'—Y'$_{n''}$ wherein R and R' represent different aromatic radicals, one being the phenyl radical and the other the diphenyl radical, Y and Y' represent members of the class consisting of hydrogen and alkyl, nitro and halogen groups, and $n'$ and $n''$ are integers, each having a value not greater than 2.

12. A phenyl-diphenyl oxide having the general formula:—

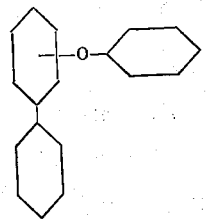

13. 2-phenyl-diphenyl oxide, a white crystalline compound melting at approximately 49°–50° C. and having probably the formula:—

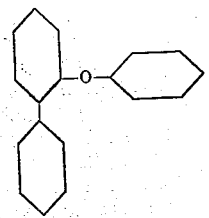

14. 3-phenyl-diphenyl oxide, obtainable as white crystals melting at approximately 17°–18° C., and having probably the formula:—

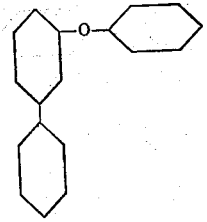

15. 4-phenyl-diphenyl oxide, a white crystalline compound melting at approximately 69°–70° C. and having probably the formula:—

WESLEY C. STOESSER.
ROBERT F. MARSCHNER.